March 12, 1935.  N. WILKINSON  1,994,376
POWER TRANSMISSION SYSTEM
Filed Feb. 2, 1931  2 Sheets-Sheet 1

Inventor
N. Wilkinson
by G. P. Dilwin
Attorney

March 12, 1935.　　　　N. WILKINSON　　　　1,994,376
POWER TRANSMISSION SYSTEM
Filed Feb. 2, 1931　　　2 Sheets-Sheet 2

Inventor
N. Wilkinson
by G. J. Elwin
Attorney

Patented Mar. 12, 1935

1,994,376

UNITED STATES PATENT OFFICE 1,994,376

POWER TRANSMISSION SYSTEM

Nathan Wilkinson, Wauwatosa, Wis., assignor to Allis-Chalmers Manufacturing Company, Milwaukee, Wis., a corporation of Delaware Application February 2, 1931, Serial No. 512,899

16 Claims. (Cl. 172—239)

This invention relates to power transmission systems and control therefor. It may be used in connection with the operation of a power driven tool and more particularly in connection with apparatus for drilling holes. It is especially adapted for use with rotary oil well drilling rigs.

A large number of different operating conditions are encountered in the drilling of oil wells. It is accordingly an object of the invention to provide a power transmission system which is flexible, enabling it to meet the varied operating conditions. A more specific object is the attainment of such flexibility with a minimum of cost; and also with a maximum of reliability.

Another object is the provision of a system of power transmission in which the control therefor is simplified, and the cost reduced. A more specific object is the elimination in an electrical control system of grid starters, and other like starters and speed controlling apparatus for the driving motors.

A further object is the provision of an electric power transmission system in which internal combustion engines are used as prime movers, and further, in which close regulation of engine speed is not required. A more specific object is the provision of such a system in which two engines are used each one automatically carrying its proportion of the total load.

In connection with oil well drilling apparatus of the type in which water is pumped into the drill hole, it is an object to provide a system of power transmission in which either the pump motor or the drill motor may be started, stopped and otherwise controlled, without affecting the other motor.

Still another object is the provision of a power transmission system in which all of the drilling and pumping operations and all of the ordinary and usual hoisting operations may be performed with either one prime mover in operation, or more than one.

Still another object is the provision of a system of power transmission in which one or more motors may be selectively operated from one or more of a plurality of generators, and more specifically in which the generators are of different capacities.

Other objects will appear hereinafter as the description of the invention proceeds.

The novel features of the invention will appear from this specification and the accompanying drawings showing one embodiment of the invention and all these novel features are intended to be pointed out in the claims.

Figure 1:
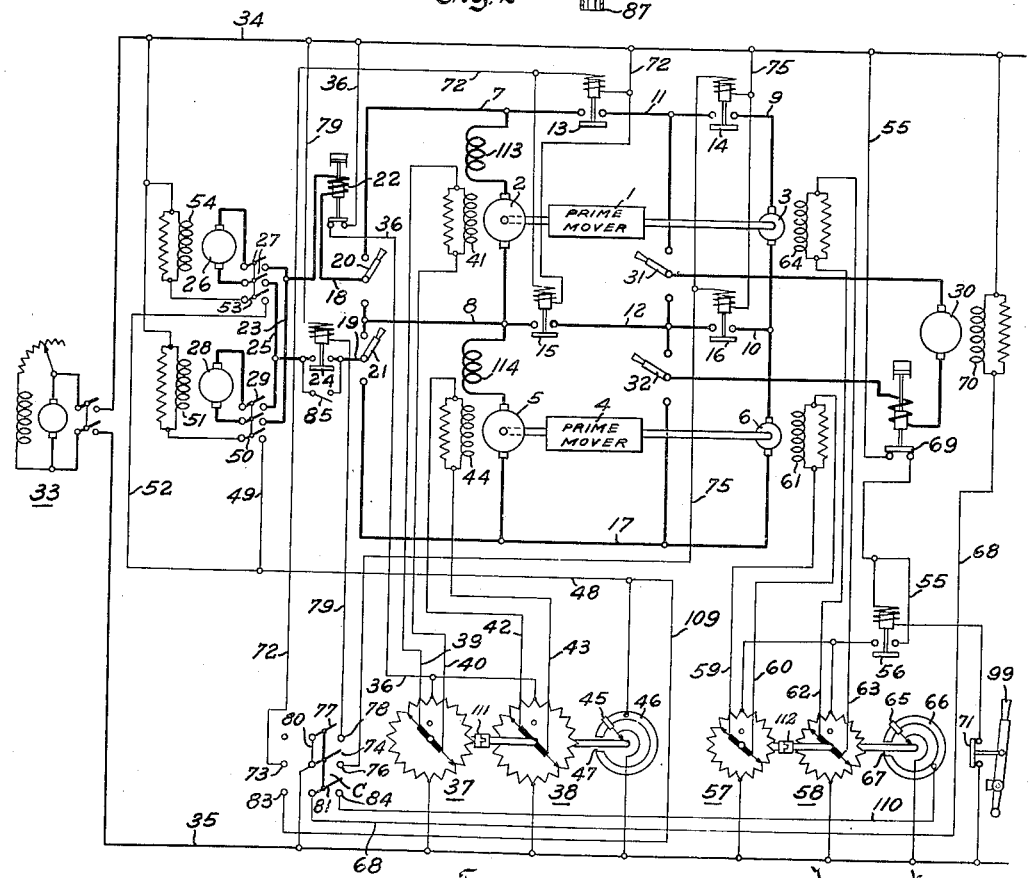
Fig. 1 is a diagrammatic showing of one embodiment of the invention with particular relation to the electrical control features thereof.

Figs. 3 to 7 inclusive are diagrams of various electrical power connections which may be obtained with the system shown in Fig. 1.

Referring to Fig. 1 of the drawings a prime mover 1 is here shown as connected to a pair of generators 2, 3. The generator 2 is diagrammatically indicated as of larger capacity than the generator 3. Another prime mover 4 is here shown as connected to two generators 5, 6 of which 5 is indicated as the larger. The generator 2 has its terminals connected respectively to conductors 7 and 8 while the generator 3 has its terminals connected respectively to conductors 9 and 10. The embodiment of the system here shown includes a pair of intermediate conductors 11, 12. The conductor 11 is connectible to the conductor 7 by means of a contactor 13, and is also connectible to the conductor 9 by means of a contactor 14. The conductor 12 is connectible to the conductor 8 by means of a contactor 15, and is also connectible to the conductor 10 by means of a contactor 16.

Where two sets of engines and generators are utilized as in the illustrative embodiment, the generator 5 may have one of its terminals connected to conductor 8 and the other terminal may be connected to a conductor 17. The generator 6 may have one of its terminals connected to conductor 10 and the other to the conductor 17.

It will be evident as the description proceeds that more than two sets of engines and generators may be utilized. Where two or more sets of generators are used, the generators of like capacity may be used in series.

A pair of conductors 18, 19 is provided which are connected respectively to the blades of switches 20, 21 which are both of the single pole double throw type. The switch 20 is adapted to connect the conductor 18 to either the conductor 7 or the conductor 8. The switch 21 is adapted to connect the conductor 19 to either the conductor 8 or the conductor 17.

The conductor 18 is connected, through a time element overload relay coil 22, to a bus 23, whereas the conductor 19 is connectible through a contactor 24 to a bus 25. One or more motors may be connected to the buses 23, 25, two motors 26, 28 being here shown. The motor 26 is connectible to buses 23, 25 by a switch 27, operating in unison with which is an auxiliary contact 53 for a purpose which will appear hereinafter. The motor 28 is connectible to the buses 23, 25 by a switch 29 which also includes an auxiliary switch 50.

Another motor 30 is here shown as having its terminals connected to the blades of a pair of single pole double throw switches 31, 32 respectively. The switch 31 is adapted to connect one terminal of motor 30 to either the conductor 11 or the conductor 12. The switch 32 is adapted to connect the other terminal of motor 30 to either conductor 12 or to conductor 17. Interposed in one of the conductors leading from one of the terminals of motor 30 is the coil of a time element overload relay 69 which is in a circuit to be described hereinafter.

An exciter 33 is here shown as connectible to the buses 34, 35 which serve to feed the operating coils of the various contactors and the field windings of the generators and motors as will be described in detail.

The field windings 41, 44 of the generators 2 and 5 respectively are here shown as controllable by a pair of reversible potentiometer rheostats 37, 38 respectively. One set of terminals of the potentiometer rheostats 37, 38 are connected by means of a conductor 36 through the contacts of the overload relay 22, to the bus 34. The other set of terminals of the rheostats 37, 38 are connected to the bus 35. The movable contacts of rheostat 37 are connected by means of conductors 39, 40 to the terminals of field winding 41, which latter is here shown as shunted by a resistance or rheostat of any desired form. The movable terminals of rheostat 38 are connected by means of conductors 42, 43 to the terminals of field winding 44, which is also here shown as shunted by a resistance or rheostat. For many of the conditions of operation the movable members of rheostats 37 and 38 may be operated in unison but if it is desired to operate these rheostats separately a coupling 111 may be disengaged. Operable in unison with rheostat 38, and of course with rheostat 37, is shown a contact 45 cooperable with a ring contact 46. The contact 45 is connected to the bus 35. The ring contact 46 has a gap 47 therein in such position that when the rheostats 37, 38 are in the "off" position the contact 45 does not engage the ring 46. For the sake of simplicity only one ring 46 and contact 45 have been shown but if desired there may be one such ring and contact not only for rheostat 38 but also for rheostat 37, this being a mere duplication of parts.

The ring 46 is connectible through conductors 48, 49 and the auxiliary switch 50 to one terminal of a field winding 51 for the motor 28. The other terminal of the field winding 51 is connected to bus 34. The ring 46 is also connectible through a conductor 52 and the auxiliary switch 53 to a field winding 54 of the motor 26, the other terminal of said field winding being connected to bus 34. The conductor 48 is connected by a conductor 109 to a contact 83 with which latter blade 81 of switch C is cooperable.

The field windings 64 and 61 of generators 3 and 6 respectively are also here shown as controllable by reversible potentiometer rheostats 57 and 58 respectively. One set of terminals of the resistances of the rheostats 57, 58 are connectible by means of a conductor 55 to the bus 34. The other set of terminals of said resistances is connected to bus 35. Interposed in the conductor 55 are the contacts of the overload relay 69 and the contacts of a relay 56. The movable contacts of rheostat 57 are connected by conductors 59, 60 to the terminals of field winding 61, and the movable contacts of rheostat 58 are connected by conductors 62, 63 to the terminals of field winding 64. Said field windings may be shunted by resistances as shown. Similarly as described in connection with rheostats 37 and 38, there is here shown one contact ring 66 with which a contact 65 operable in unison with rheostat 58 cooperates. The ring 66 also has a gap 67 so that when the rheostat 58 (or the rheostat 57) is in the "off" position, the contact 65 will be out of engagement with the contact 66. A coupling 112 may also be provided between the rheostats 57 and 58 for reasons as stated in connection with rheostats 37 and 38. The ring 66 is connected through a conductor 110 to a contact 84 of a master control switch C. The contact 65 is connected to the bus 35.

Cooperable with contact 84 is a switch blade 81 of master switch C, which blade is connected by means of a conductor 68 to one terminal of a field winding 70 for the motor 30. The other terminal of said field winding is connected to the bus 34, and said field winding may also be shunted by a resistance as shown.

The operating coil for contactor 56 has one terminal connected to conductor 55 and the other terminal connected through a contact 71 to the bus 35. The contact 71 is controlled by means of a lever 99 which will be further described hereinafter in connection with Fig. 2.

The operating coils of contactors 13 and 15 are here shown as in parallel and interposed in a conductor 72 one end of which is connected to bus 34 and the other end of which is connected to a contact 73 of the master control switch C. A blade 74 of the switch C is connected to bus 35, and is cooperable with contact 73.

The operating coils of contactors 14 and 16 are here shown as in parallel and interposed in a conductor 75 one terminal of which is connected to bus 34 and the other terminal of which is connected to a contact 76 of the switch C. The blade 74 of the switch C is also cooperable with the contact 76.

The operating coil of contactor 24 is interposed in a conductor 79 one terminal of which is connected to bus 34 and the other of which is connected to a contact 78 of the switch C. Cooperable with contact 78 is a blade 77 of the master switch C. The blade 77 is also electrically connected by conductor 80 with the blade 74, and therefore also to bus 35.

For a purpose which will appear in connection with the description of the operation of the system, a switch 85 is provided for bypassing the contactor 24. The switch is, under the usual operating conditions, open.

Figure 2:
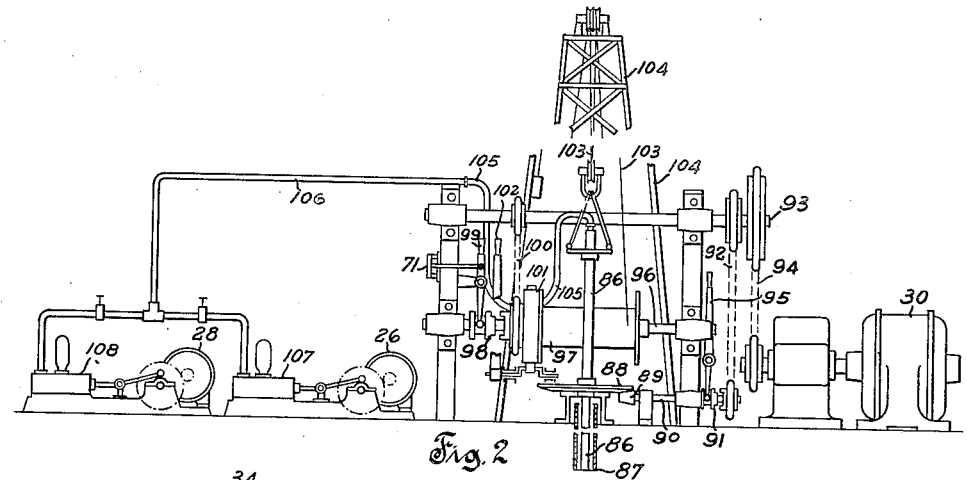
Fig. 2 is a more or less diagrammatic elevation of mechanical features of one type of oil well drilling rig in connection with which the invention may be used.

Referring now to Fig. 2, this shows in more or less diagrammatic form an oil well drilling rig of the rotary type with which the invention may be utilized. It is to be understood that the particular form of mechanical drilling rig is shown only by way of illustration so that one way in which applicant's invention may be utilized may be better understood. The drilling rig here shown comprises a hollow drill 86 around which is disposed a casing 87 which is sunk around the drill as the drilling proceeds. The drill 86 may be rotated in any suitable manner by means of a gear 88 driven by a bevel pinion 89 from a shaft 90. The shaft 90 may be connected to a driving chain 92 by means of a clutch 91 operable by a lever 95. The driving chain 92 is in operative relation to a shaft 93 which is in turn driven by a driving chain 94 from the motor 30 which corresponds to the motor 30 in Fig. 1. A shaft 96 is provided which carries fast thereon a winding drum 97. The shaft 96 may be connected to a driving chain 100 by means of a clutch 98 operable by a clutch lever 99. The clutch lever 99 is operatively related to the switch 71 which corresponds to the switch of same number in Fig. 1, and it will be apparent that when the clutch 98 is disengaged the switch 71 is closed. A brake 101 is provided for the drum 97, which brake is operable by means of a brake lever 102.

The winding drum 97 is adapted to receive a cable 103 which runs to the top of a derrick 104 and is passed over suitable pulley blocks or sheaves at the top of the derrick and also over a sheave operatively related to the drill rod 86, so that the winding drum 97 may be used to hoist and lower the drill rod 86, or other desired parts. The drill rod is here shown as connected by means of a flexible hose 105 to a pipe 106, in turn connected to a pair of pumps 107, 108 of any suitable form. The pumps are here shown as driven respectively by the motors 26, 28 which correspond to those of the same number in Fig. 1.

The operation of the system will be best understood by a consideration of various power set-ups that may be secured therewith.

Figure 3:
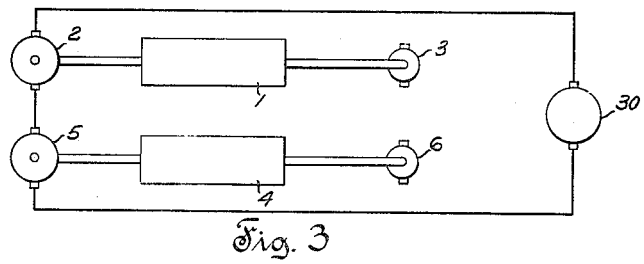

If it is desired to hoist the drill rod 86, or any other part attached to the hoisting cable 103, at full speed, the motor 30 is connected to the large generators 2, 5 in series, as indicated in Fig. 3, as follows: It is assumed that the exciter 33 is connected to the buses 34, 35, and that the hoisting drum 97 is connected to the shaft 93 by means of the clutch 98. The switch 31 is thrown to its upper contact and the switch 32 to its lower contact. The master switch C is thrown to the left, as viewed in the drawings, thereby connecting the blades 74 and 81 to the contacts 73 and 83 respectively. It will be noted, incidentally, that the contact with which the blade 77 contacts, in this position, is, in the illustrative embodiment, a dead contact. With the master switch C in the position stated the contactors 13 and 15 have their operating coils energized and are closed. It may be noted that in the illustrative embodiment and in the particular set-up now under consideration the contactor 15 will not be in any circuit. It will be also noted that while the blade 81 is in engagement with the contact 83 the field winding circuit for the motor 30 is not as yet completed since the contact 45 is, in the starting position, not in contact with the ring 46. The generator field winding rheostats 37, 38 may now be operated to increase the electromotive force generated by generators 2 and 5, also thereby closing the field winding circuit for motor 30. It is of course clear that the motor 30 will operate in a direction dependent upon which direction the rheostats 37 and 38 have been moved. The provision of differential series field windings 113, 114 for generators 2, 5 respectively, gives these machines drooping characteristics, which coacts with the method of speed control of motors 30, 26 and 28 by generator field excitation to give good starting torque and acceleration control.

With the set-up of Fig. 3 described above the motor 30 which may be say a 400 H. P. motor operating at 1000 R. P. M. at 350 volts with a peak load of say 600 H. P., is fed from the two large generators which are say of 200 k. w. capacity each operating at 1200 R. P. M. and generating 175 volts each. The engines 1, 4 are rated at 385 H. P. each at 1200 R. P. M. The foregoing figures are given merely by way of example as are also the ratings of other machines to be hereinafter noted. It will be obvious that the invention is in no way limited to the selection or use of machines of the ratings, voltages and speeds herein given and that those skilled in the art may easily make a choice of ratings etc. suitable to meet any particular conditions. The ratings given in this specification are cited merely to further bring out the possibilities and flexibility of the disclosed system.

The engines 1 and 4 are provided with the usual governors (not shown) so that if desired the speeds of these engines may be kept at substantially 1200 R. P. M., as in the above cited example, or at any other selected speed, as will be understood by those skilled in the art.

Figure 4:
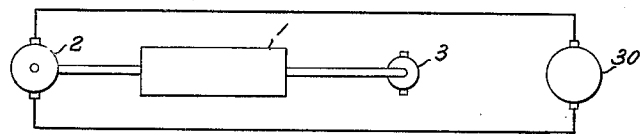

If it is desired to hoist at half speed the electrical set-up of Fig. 4 may be secured by throwing both the switches 31 and 32 to their upper positions. The mechanical set-up of the parts of Fig. 2 are the same as described in connection with the set-up of Fig. 3, and the master switch is also in the same position. It will be noted, however, that since in the set-up of Fig. 4 the motor 30 is operating from generator 2 only, the contactor 15 is now in the circuit feeding motor 30. With this set-up the engine 1 is the only one in operation and may operate as before with 385 H. P. at 1200 R. P. M. The 200 k. w. generator 2 now feeds the motor 30 at 175 volts and therefore the motor runs at half speed, that is, 500 R. P. M.

If for any reason it is desired to hoist at half speed with the motor 30 fed from generator 5, the electrical set-up will be the same as in Fig. 4, but to secure the same the switches 31 and 32 are both thrown onto their lower contacts. The contactor 15 is here again in circuit with the motor 30, and of course the master switch C remains in the same position as for the set-up in Figs. 3 and 4.

It will be noted that with the hoisting set-ups as hereinbefore described in which the lever 99 has been thrown to cause engagement of the clutch 98, the switch 71 is opened, thereby deenergizing the contactor 56. The opening of this contactor opens the circuit of rheostats 57 and 58 and prevents current from being fed to the field windings of generators 3 and 6.

Figure 5:
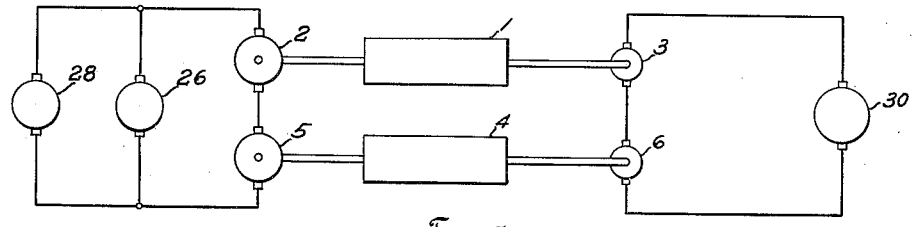

If it is desired to rotate the drill 86 and pump water down through the drill at the same time, the clutch 98 is thrown out (thereby closing switch 71) and the clutch 91 is thrown in so as to connect the driving shaft 90 for rotating the drill, to the shaft 93. The switch 31 is thrown to its upper position and the switch 32 is thrown to its lower position. The switches 20 and 21 are thrown respectively to their upper and lower positions. The master switch C is thrown to its right hand position, thereby energizing the operating coils of contactors 14 and 16, by reason of the engagement of blade 74 with contact 76. It will be incidentally noted that contactor 16 will not be in any circuit in this particular set-up. The engagement of blade 77 with contact 78 energizes the operating coil of contactor 24. If it is desired to use both pumps 107 and 108, both switches 27 and 29 are closed thereby connecting the armature circuits of motors 26 and 28 to the conductors 7 and 17. While the auxiliary switches 53 and 50 are closed it will be noted that the circuits for the field windings 54 and 51 are incomplete since at the start contact 45 is not in engagement with ring 46. The rheostats 37 and 38 may now be operated in the proper direction thereby causing the generators 2 and 5, in series, to feed the pump motors 26, 28 as shown in Fig. 5. Inasmuch as the contact 71 is closed, the relay 56 is energized and therefore operation of the rheostats 57, 58 will supply current to the field windings of generators 3 and 6. The engagement of contact 65 with ring 66 causes the field winding 70 of motor 30 to be supplied with current.

It will be evident that with the set-up of Fig. 5 the motor 30 may be used at full speed for the drilling operation since it is fed from the generators 3 and 6 in series. By way of example, the generators 3 and 6 may be of 40 k. w. capacity each at a voltage of 125. For this drilling and pumping operation the engines 1 and 4 may have their governors set to operate at say 850 R. P. M., the engines producing at that speed say 260 H. P. The motor 30 may then operate at say 710 R. P. M. at 250 volts and produce say 100 H. P. The larger generators 2 and 5 operating at 850 R. P. M. at 125 volts may produce say 142 k. w. Each of the pump motors 26, 28 may be rated at say 276 H. P. at 850 R. P. M., noting that adequate pumping capacity may be obtained by using either one of the pumping units; however, from the above data it is apparent that there is adequate generator capacity for the other pumping unit to be operated at the same time with reduced output for "mixing mud", if desired. It will be obvious of course that with the machines in the cited example, the power produced and consumed may be widely varied by adjustment of the rheostats 37, 38 and 57, 58.

If the operator should for any reason, while the system is operating with the set-up of Fig. 5 as hereinbefore described, attempt to use the hoist drum 97 by throwing the clutch 98 into engagement, the contact 71 will be opened thereby deenergizing contactor 56 and consequently deenergizing the field circuits of the generators 3 and 6, to which the motor 30 is at that time connected.

If it is desired to drill and pump at half speed, the set-up of Fig. 6 may be secured as follows: The mechanical set-up in connection with Fig. 6 may be the same as in connection with Fig. 5. The switches 31 and 32 are both thrown to their upper positions, and the switches 20 and 21 are likewise both thrown to their upper positions. The master switch C remains in its right hand position as described in connection with the set-up of Fig. 5. By operation of the rheostat 58 the motor 30 may now be fed from generator 3 through contactors 14 and 16 while either of the motors 26, 28 may be fed from generator 2. The voltage of generator 2 may of course be controlled by rheostat 37. For this set-up the engine 1 preferably has its governor set for a lower speed as in case of the half speed hoisting set-up of Fig. 4. The pump motor 26 may now operate with a rating of say 137 H. P. at 425 R. P. M. since it is fed from one generator at 125 volts. The drill operating motor 30 may produce say 50 H. P. at 355 R. P. M. being also fed at say 125 volts from generator 3.

Figure 7:
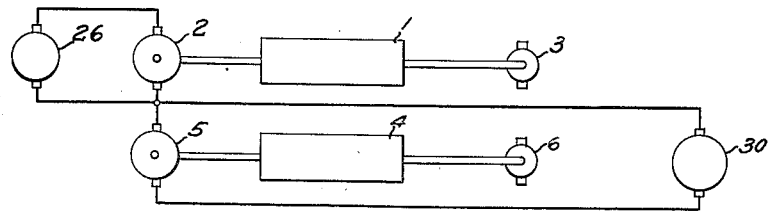

It sometimes occurs that it is desirable to hoist and pump at the same time. For this purpose the "fishing" set-up, as shown in Fig. 7, may be obtained. With this set-up hoisting operations may be performed as in case a drill rod should break and at the same time one of the pumps may be used. This "fishing" set-up may be secured with a pump motor fed from generator 2 and the motor 30 fed from generator 5 or vice versa. The operations for securing the set-up shown in Fig. 7 will first be described. The clutch 98 is thrown in and if it is desired to hoist only, the clutch 91 is thrown out. The switches 31 and 32 are both thrown to their lower positions. The switches 20 and 21 are both thrown to their upper positions. The master switch C is thrown to its left hand position thereby causing closure of contactors 13 and 15. The switch 85 is closed by hand, in the illustrative embodiment, to thereby connect the bus 25 to the blade 21. It will be noted that with the master switch in its left hand position the bypassing of contactor 24 is necessary since in that position of the master switch the coil of contactor 24 is not energized. The switch 27 for pump motor 26 is closed and the rheostats 37 and 38 operated either separately or in unison as desired. For this set-up the engines 1 and 4 may have their governors set to cause operation of the engines at substantially 1200 R. P. M., for example. The pump motor 26 may then operate at say 590 R. P. M. with a rating of 192 H. P., being fed from the generator 2 operating with a rating of 200 k. w. at 1200 R. P. M. The motor 30 operates at a rating of say 200 H. P. at 500 R. P. M. from the generator 5 operating at a rating of 200 k. w. at 1200 R. P. M.

If for any reason it is desired to operate the motor 30 from generator 2 and a pump motor from generator 5, the switches 31 and 32 are both thrown to their upper positions and the switches 20 and 21 are both thrown to their lower positions. The master switch remains in its left hand position and the remaining operations are similar to those described in connection with Fig. 7.

If for any reason it is desirable to rotate the drill as it is being hoisted, or lowered, with for example the "fishing" set-up of Fig. 7, the clutch 91 may be thrown into engagement.

In general, it will be apparent that current will not be supplied to either of motors 26, 28 unless the auxiliary switches 53 and 50 are closed. Moreover, when the rheostats 37, 38 and 57, 58 are in their "off" positions, the field winding circuits of the pump motors will be interrupted even if the auxiliary switches 53, 50 are closed, which is true irrespective of the position of the master switch C. When the rheostats 57, 58 only for the smaller generators 3, 6 are "on" field current can be obtained for the motor 30 only if the master switch C is in its right hand position, which is the position for the normal drilling operation. When the rheostats 37, 38 only are "on" current can be obtained for the field windings of the pump motors provided the switches for these motors are respectively closed, and current can be obtained for the field winding of motor 30 provided the master switch C is in its left hand position which is the hoisting position.

Figure 6:
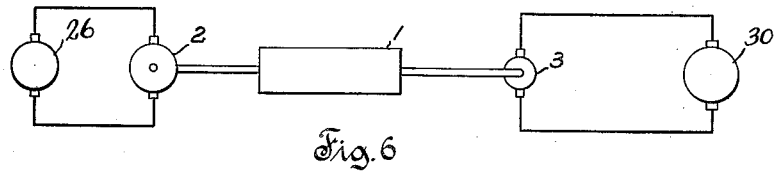

It will be obvious that if desired, particularly in connection with the set-ups of Figs. 4, 6 and 7, the rheostat for generator 2 may be operated separately from the rheostat for generator 5 by simply disengaging the coupling 111, and particularly in the case of Fig. 6 the rheostat for generator 3 may be operated separately from that for generator 6 by disengaging the coupling 112.

It will be evident from the description of the various set-ups that if desired only one engine and one set of generators need be used, if desired, for the first few thousand feet of drilling (the set being say as in Fig. 6) and that subsequently, or at any desired time, more than one engine and set of generators may be used for drilling (the set-up being say as in Fig. 5). It is of course obvious that the same applies at any stage of the drilling since if one engine fails, operations may be carried on with the other engine but with the driving motors operating at half speed. Full torque is however available whether the motors are running at full speed or half speed. Moreover to secure this full torque under either condition of operation it is unnecessary to alter the driving or gear ratio as between the driving motors and the mechanical drill rigging.

What has been stated above also applies with regard to the full speed and half speed hoisting set-ups of Figs. 3 and 4 respectively.

The exciter 33 being separately driven by an auxiliary engine (not shown) makes possible the use of said exciter for various purposes, such as for lighting the drill site, without necessity of having the main engines 1, 4, running, or even before said main engines are available at all as while the drilling rig and drive are being erected.

Certain features, and more particularly features relating to a system for well drilling purposes, of the invention disclosed but not claimed herein are disclosed in applicant's copending application Serial No. 678,235, filed June 29, 1933, in and through which latter application claims are sought covering such features, the latter application being a continuation in part of the present application.

It should be understood that it is not desired to limit the invention to the exact details of construction shown and described, for obvious modifications may occur to persons skilled in the art.

It is claimed and desired to secure by Letters Patent:

1. In combination, two pairs of generators, the units of the respective pairs being of different capacity and connectible in series, a motor, means for selectively connecting said motor to one or both of said generators of larger capacity or selectively to one or both of said generators of the smaller capacity, a second motor, means for connecting said second motor to one or both of said generators of the larger capacity, and means for preventing the connection of said second motor to both of said generators of larger capacity when said first motor is connected to at least one of said larger generators.

2. In combination, a pair of generators of predetermined capacity connectible in series, a pair of generators of lower capacity connectible in series, a motor, means for selectively impressing the voltage of one or both of said generators of predetermined capacity on said motor, means for selectively impressing the voltage of one or both of said generators of smaller capacity on said motor, a second motor, means for selectively impressing the voltage of one or both of said generators of predetermined capacity on said second motor, and interlocking means for preventing the impression of the voltage of any one of said generators on both of said motors concurrently.

3. In combination, a pair of D. C. generators, of different capacities, each of said generators having a separately excited field winding, a field rheostat for independently controlling the energization of each of said field windings, each of said rheostats having a neutral position, a pair of switches operable to their open position by movement of said rheostats to their respective neutral positions, a prime mover arranged to simultaneously drive both of said generators, a pair of conductors, a motor having a separately excited field winding, means for connecting said motor to said pair of conductors, and means for connecting said pair of conductors selectively to one or the other of said generators comprising electromagnetic contactors and a master switch operable to selectively control said contactors, said master switch having auxiliary contacts arranged to selectively connect said rheostat operated switches in series with said motor field winding.

4. In combination, a pair of generators of different capacities, a pair of conductors, a motor, means for connecting said motor to said conductors, an electromagnetically operable contactor for connecting a terminal of the smaller of said generators to one of said conductors, a second electromagnetically operable contactor for connecting a terminal of the larger of said generators to said one of said conductors, means whereby the other terminals of said generators may be connected together, means for connecting the other of said conductors with said other terminals of said generators, a second motor, means including an electromagnetically operable contactor for connecting said second motor to one of said generators, and means including a control switch having one position in which the operating winding of said last named contactor and the operating winding of one of the two first named contactors is energized and another position in which only the operating winding of the other of said first two named contactors is energized.

5. In combination, a pair of series connected generators of predetermined capacity, a pair of series connected generators of smaller capacity, each pair of generators being provided with a neutral and two outside terminals, three conductors corresponding respectively to said terminals, a motor, means whereby said motor may be connected to any pair of said three conductors, and means for selectively connecting said three conductors to the outside and neutral terminals respectively of either of said pairs of generators.

6. In combination, a pair of series connected generators of predetermined capacity, a pair of series connected generators of smaller capacity, each pair of generators being provided with a neutral and two outside terminals, three conductors corresponding respectively to said terminals, a motor, means whereby said motor may be connected to any pair of said three conductors, means for selectively connecting said three conductors to the outside and neutral terminals respectively, of either one or the other of said pairs of generators, a second motor, and means for selectively connecting said second motor to any pair of the terminals of said first named pair of generators.

7. In combination, a pair of series connected generators of predetermined capacity, a pair of series connected generators of smaller capacity, each pair of generators being provided with a neutral and two outside terminals, three conductors corresponding respectively to said terminals, a motor, a pair of independently operable single pole double throw switches, means for so connecting said switches with said motor and said conductors that said motor may be selectively connected to any pair of said three conductors, and means for selectively connecting said three conductors to the outside and neutral terminals respectively, of one or the other of said pairs of generators.

8. In combination, a pair of generators of predetermined capacity connectible in series, a pair of generators of smaller capacity connectible in series, each pair of generators being provided with a neutral and two outside terminals, three conductors corresponding respectively to said terminals, switching means for selectively connecting said three conductors either to the terminals of said generators of predetermined capacity or to the terminals of said generators of smaller capacity, a motor, a pair of single pole double throw switches independently operable to selectively connect said motor to any pair of said three conductors, a second motor, a second pair of single pole double throw switches independently operable to selectively connect said second motor to any pair of the terminals of said first mentioned pair of generators.

9. In combination, a generator having armature and field windings, a source of power for separately exciting said generator field winding, a potentiometric rheostat operable to control the magnitude and direction of the excitation of said generator field winding, a motor having an armature winding connected across said generator armature winding and having a field winding energized from said source of power, and means operable upon movement of said rheostat to an intermediate contacting position for interrupting the energization of said motor field winding.

10. In combination, a generator, a field winding for said generator, a rheostat in the circuit of said generator field winding, a motor, means for connecting said motor to said generator, a field winding for said motor, an auxiliary switch in series with said motor field winding and closed by means initiating the closure of said connecting means, another switch in series with said motor field winding opened in response to movement of said rheostat to a predetermined position.

11. In combination, a pair of generators, a field winding for each of said generators, a rheostat in circuit with each of said field windings, a motor, a field winding for said motor, means for connecting said motor to either of said generators and means whereby the field winding circuit of said motor may be completed in joint response to the connection of said motor to a generator and to the movement to an operative position of the field rheostat associated with said generator.

12. In combination, a pair of generators, a field winding for each of said generators, a rheostat in circuit with each of said field windings, a motor, a field winding for said motor, means for connecting said motor to either of said generators, means whereby the field winding circuit of said motor may be completed in joint response to the connection of said motor to a generator and to the movement to an operative position of the field rheostat associated with said generator, a second motor, a field winding for said second motor, means for connecting said second motor to one of said generators, and means whereby the field winding of said second motor may be completed in joint response to the connection of said second motor to said generator and to the movement of the field rheostat associated with said generator.

13. In combination with a power consuming element, an electric motor for driving said element, a pair of D. C. generators, a pair of independent prime movers arranged to drive said generators respectively, switching means for selectively connecting both of said generators in series with said motor to cause said motor to operate at full speed or for connecting either generator across said motor to cause said motor to operate at half speed with the same torque, rheostats operative to control the degree and direction of field excitation of said generators respectively, and means associated with said rheostats for reducing the field excitation of said motor to a minimum when said field controlling rheostats of the generator or generators connected to supply said motor are in a position corresponding to minimum degree of field excitation of said generators.

14. In combination, a pair of generators connectible in series, a pair of internal combustion engines for independently driving said generators respectively, said generators each having a separately excited field winding and a series differential field winding, an electric motor having a separately excited field winding, switching means for selectively connecting said motor across either one or both of said generators, an exciter for energizing the separately excited field windings of said motor and said generator, rheostats operable to control the magnitude and polarity of the excitation of the separately excited generator field windings, said rheostats having a zero excitation position, and switch means actuated by said rheostats to interrupt the excitation of said motor field windings when said rheostats are moved to said zero excitation position.

15. In combination, a pair of generators of predetermined capacity connectible in series, a pair of generators of smaller capacity connectible in series, a pair of independent internal combustion engines, each of said engines being arranged to drive one of said generators of larger capacity and one of said generators of smaller capacity, each of said generators having a separately excited field winding, a pair of motors, switching means selectively operable to connect one of said motors across either one or both of said generators of predetermined capacity and to selectively connect the other of said motors across either one or both of said generators of smaller capacity, and an exciter arranged to supply excitation to said field windings.

16. In combination, a pair of generators of predetermined capacity connectible in series, a pair of generators of smaller capacity connectible in series, a pair of prime movers, each of said prime movers driving a generator of predetermined capacity and a generator of smaller capacity, a motor, and means for selectively establishing connections for energizing said motor from one or both of said generators of predetermined capacity or from one or both of said generators of smaller capacity, said means comprising manually operable switches for partially and selectively establishing said connections and electromagnetically operated contactors for completing said selected connections.

NATHAN WILKINSON.